(12) United States Patent
Denham et al.

(10) Patent No.: US 6,826,820 B2
(45) Date of Patent: Dec. 7, 2004

(54) INSERT AND METHOD OF INSTALLATION THEREOF

(75) Inventors: Keith Denham, Herts (GB); Sean Peter McGain-Harding, Beds (GB); Jonathan Lee Brewer, Beds (GB)

(73) Assignee: Textron Fastening Systems Limited (GB)

( * ) Notice: Subject to any disclaimer, the term of this patent is extended or adjusted under 35 U.S.C. 154(b) by 129 days.

(21) Appl. No.: 10/149,991

(22) PCT Filed: Dec. 13, 2000

(86) PCT No.: PCT/GB00/04769

§ 371 (c)(1),
(2), (4) Date: Sep. 24, 2002

(87) PCT Pub. No.: WO01/44674

PCT Pub. Date: Jun. 21, 2001

(65) Prior Publication Data

US 2003/0091406 A1 May 15, 2003

(30) Foreign Application Priority Data

Dec. 14, 1999 (GB) .............................................. 9929560

(51) Int. Cl.⁷ .......................... F16B 13/04; F16B 39/00; F16B 37/04
(52) U.S. Cl. ....................... 29/524.1; 72/391.6; 411/34; 411/38; 411/181
(58) Field of Search .............................. 411/34, 38, 183, 411/501; 29/509, 243.53, 524.1, 525.02; 72/391.6, 391.8

(56) References Cited

U.S. PATENT DOCUMENTS

| 2,562,336 A | * | 7/1951 | Selden ........................ 411/501 |
| 2,670,021 A | * | 2/1954 | Torresen et al. ............... 411/34 |
| 2,887,926 A | * | 5/1959 | Bryant ......................... 411/38 |
| 3,304,830 A | * | 2/1967 | Shackelford ................. 411/34 |
| 3,557,597 A | * | 1/1971 | Heslop et al. ............. 29/812.5 |
| 5,219,252 A | * | 6/1993 | Schruff ........................ 411/34 |
| 5,403,135 A |   | 4/1995 | Renner et al. |
| 6,109,849 A | * | 8/2000 | Nagayama ................... 411/181 |

FOREIGN PATENT DOCUMENTS

| EP | 0494747 A1 | 7/1992 |
| GB | 1057763 | 2/1967 |
| GB | 2120347 | 11/1983 |

* cited by examiner

Primary Examiner—David B. Jones
(74) Attorney, Agent, or Firm—Trexler, Bushnell, Giangiorgi, Blackstone & Marr, Ltd.

(57) ABSTRACT

An insert for installation in a relatively thin or weak workpiece to provide an anchor for a self-tapping screw, which insert is in the form of an integral metal structure which comprises: a body portion; a head portion located at or near one end of the body portion and extending radially therefrom; a receptacle portion located at the other end of the body portion remote from the head portion; and a through bore extending throughout the head, body and receptacle portions; the interior bore of the receptacle portion being substantially unthreaded for the reception of a self-tapping screw; in which the exterior cross-sectional shape and dimensions of the receptacle portion, and the interior cross sectional shape and dimensions of the body portion are respectively such that the body portion is deformable, when the receptacle portion is drawn towards the head portion, to secure the insert in a suitable hole in a workpiece through which the receptacle and body portions have been inserted so that the head portion is adjacent the workpiece and a substantial length of the body portion protrudes beyond the workpiece; and in which any transverse dimension of the exterior of the receptacle portion is no greater than the corresponding transverse dimension of the interior of the body portion in the same transverse plane; the exterior cross-sectional shape and dimensions of the body portion being such that, when the receptacle portion is drawn towards the head portion, the part of the body portion nearer the receptacle portion enters inside the part of the body portion nearer the head thereby to enhance the engagement of the deformed body portion with the workpiece.

19 Claims, 5 Drawing Sheets

INSERT AND METHOD OF INSTALLATION THEREOF

RELATED/PRIORITY APPLICATIONS

This application claims priority with respect to International Application No. PGT/GB00/04769, filed Dec. 13, 2000 and British Application No. 9929560.2, filed Dec. 14, 1999.

The invention relates to an insert for installation in a relatively thin or weak workpiece to provide an anchor receptacle for a self-tapping screw or the like.

Self-tapping screws are widely used in industry as providing a means of securing together two components which is inexpensive in respect of both manufacturing cost and installation time. However, their use has a number of disadvantages, stemming from the material or receptacle into which they are inserted.

When a self-tapping screw is driven directly into a workpiece of thin or weak material, the failure strength of the thread formed in the workpiece is low. Further, there is little margin between this and the torque that is required to start the thread engagement. Thus it can be difficult to control the fastener installation torque so as to avoid thread stripping. Also, the tension strength of the resultant joint is limited by the tensile strip-out force of the thread in the thin or weak material.

A grommet or insert of plastics material (e.g. nylon) is sometimes used as a receptacle for a self-tapping screw. However, since plastics material is relatively weak, it requires a long length of screw engagement to provide enough strength to create sufficient margin between the screw-engagement torque and the thread strip-out torque so as to enable adequate control of the operation in a practical industrial environment, such as a car assembly line. The long length of the screw engagement produces a large protrusion on the rear or blind side of the workpiece, which may be awkward or dangerous in the use of the assembled product. The longer screw also takes more time to instal.

Furthermore since the insert or anchor is of totally different material to the workpiece (e.g. plastics as against steel), ultimate scrapping of the assembled product (e.g. a car body) makes it difficult to recover both materials. Plastics components are usually burnt off and the material not recovered.

One possible alternative would be to use a blind threaded insert, such as is widely known and available in many countries under the name AVDEL THIN SHEET NUTSERT (Registered Trade Marks) in conjunction with a machine screw or bolt. This can have drawbacks under production-line conditions where speed of operation is under pressure, such as difficulty of engaging threads, leading to cross-threading. Further, if the component with the installed threaded insert is painted before the screw is applied, the paint can enter the insert and jam the threads thus preventing proper engagement of the screw.

One of the aims of the present invention is to provides an insert which overcomes these practical disadvantages of the prior art. The invention is defined in the accompanying claims.

Some specific embodiments of the present invention will now be described by way of example and with reference to the accompanying drawings, in which.

Figure 1A:
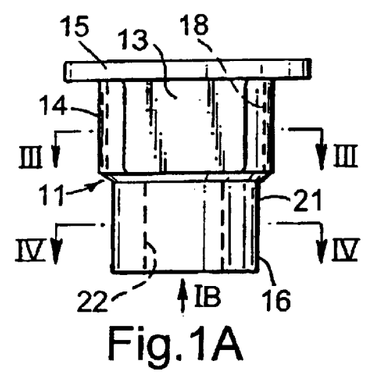
FIGS. 1A and 1B, 2A and 2B, and 3, 4 and 5, illustrate two alternative forms of insert.
Figure 1B:
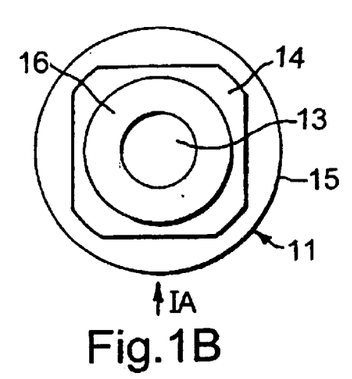
Figure 2A:
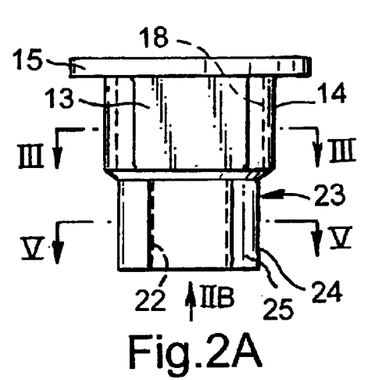
Figure 2B:
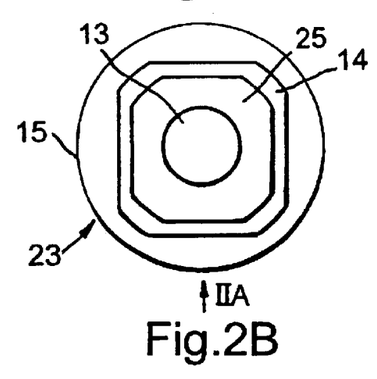

Referring first to FIGS. 1 to 5, FIGS. 1A & 2A are elevations of two slightly different forms of insert, FIGS. 1B & 2B are underplan views in the direction of the arrows IB & IIB of FIGS. 1A & 2A, and FIGS. 3, 4 & 5 are sections on the lines III—III, IV—IV and V—V of FIGS. 1A & 2A. In FIGS. 1A & 2A the walls of the bore are indicated in phantom.

Figure 3:
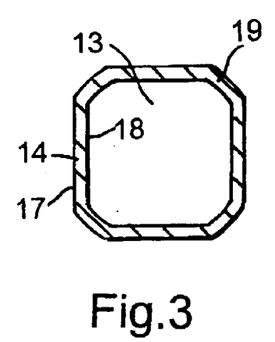
Figure 4:
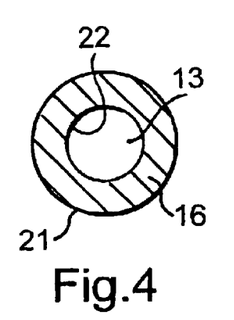
Figure 5:
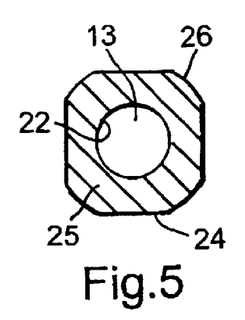

The first example insert 11 shown in FIGS. 1, 3 & 4 is a unitary structure of steel of generally tubular form with a through bore 13. It comprises a body portion 14 formed integrally with a radially enlarged flange-like head 15 at one end and a receptacle portion 16 at the other. The exterior 17 and interior 18 are both substantially square in shape, having chamfered or rounded corners 19. The receptacle 16 has its exterior 21 and interior 22 both cylindrical, i.e. circular in cross-section, the interior face 22 being unthreaded. The axial lengths of the body 14 and receptacle 16 are substantially the same. The head 15 is circular in exterior shape and relatively thin in the axial direction. The wall thickness of the body 14 is similar to the thickness of the head flange 15, whereas the wall thickness of the receptacle 16 is substantially greater than these. The diameter of the exterior 21 of the receptacle 16 is slightly smaller than the minimum diameter (i.e. the distance between opposed faces) of the interior 18 of the body, so that the exterior 21 of the receptacle 16 is a sliding fit in the interior 18 of the body 14 of an identical insert 11.

The second form of insert, illustrated in FIGS. 2A, 2B, 3 and 5 is a modification of that first described with reference to FIGS. 1A, 1B, 3 and 4, like parts being indicated by like numerals. The second form of insert 23 is identical, except that the exterior 24 of its receptacle 25 is of substantially square cross-section, with rounded corners 26. Again, the exterior 24 of the receptacle 25 of the insert is a sliding fit within the interior of the body 14 of an identical insert.

FIGS. 6 to 10 illustrate the installation sequence of the first form of insert 11 shown in FIGS. 1A and 1B. The installation tool 26 is generally similar to those well-known for installing blind breakstem rivets, except that it has a re-usable mandrel 27 comprising an elongated stem 28 with gripping grooves 29 adjacent one end and an enlarged head 31 at the other end, including a taper 32 by which it merges into the stem 28. The diameter of the mandrel stem 28 is a sliding fit within the interior 22 of the receptacle 16 of the insert. As is usual the tool has a tubular nosepiece 33 ending in an annular anvil face 34. Inside the nose piece 33 is a jaw-carrier 35 holding two jaws 36 which engage the gripping grooves 29 of the mandrel. The jaw carrier provides a tapered collet which urges the jaws together. In order to facilitate the installation of the insert, the tool also includes a reciprocable support tube 37, the exterior of which is of the same diameter as the exterior of the insert receptacle 16, so that it is a sliding fit within the body 14 of the insert 11, and its interior is a sliding fit on the mandrel stem 28. The tool includes means (such as pneumatic, hydro-pneumatic or electric drive), not shown, for retracting the jaw carrier 35 with respect to the nosepiece 33.

Figure 6:
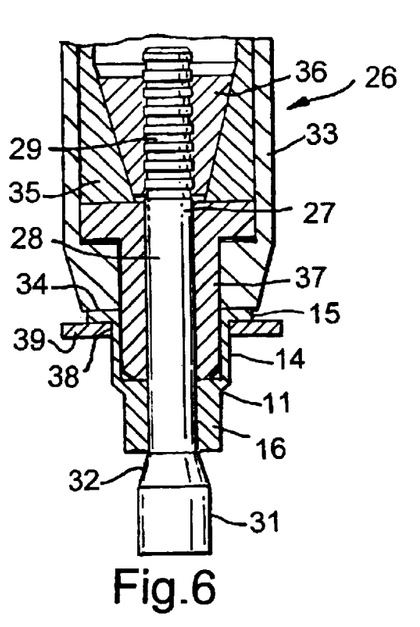
FIGS. 6 to 10 illustrate the progressive stages in the deformation of one form of insert as it is installed.

In order to use the tool, the mandrel is removed from the tool by pushing it inwards to open the jaws, and then withdrawing it. An insert is assembled over the tail end of the mandrel, receptacle end first, until the end of the receptacle contacts the bottom of the taper 32 of the mandrel head, (see FIG. 6). The mandrel tail is then inserted through the support tube 37, to engage within the jaws 36. The relative dimensions of the insert and tool are such that the insert head 15 is then in contact with the tool anvil 34 (FIG. 6). In order to instal the insert 11 in an appropriately dimensioned pre-formed square hole 38 in a sheet-like workpiece 39, the tool 26 is manipulated by its operator (if the tool is handheld, or it could be guided and advanced mechanically) so that the insert 11 is fed into the hole 38 until the insert head 15 is in contact with the workpiece 39 against which it is supported by the anvil 34. As illustrated in FIG. 6, the majority of the length of the body 14 of the insert protrudes beyond the workpiece.

The tool is then activated so that its drive retracts the jaw carrier 35 within the nosepiece 33, pulling the mandrel head 31 towards the anvil 34. The axial compression thus exerted on the insert causes it to deform progressively in two ways.: The mandrel head taper 32 and full diameter portion 31 progressively radially expand the receptacle 16 and enter it axially, and the body 14 progressively collapses axially by outward radial expansion. The progressive stages are illustrated in FIGS. 7 to 10. The body 14 of the insert buckles outwardly (FIG. 7), which buckling is promoted by the shape of the junction between the body 14 and the receptacle 16. Eventually the buckling is sufficient to form a folded flange 41 (FIG. 8), the workpiece 39 being gripped between the insert head 15 and the flange 41.

Figure 7:
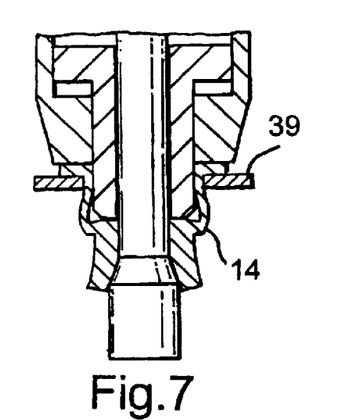
Figure 8:
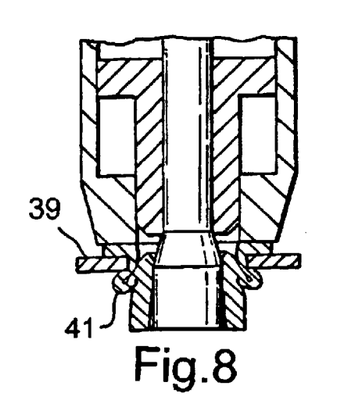
Figure 9:
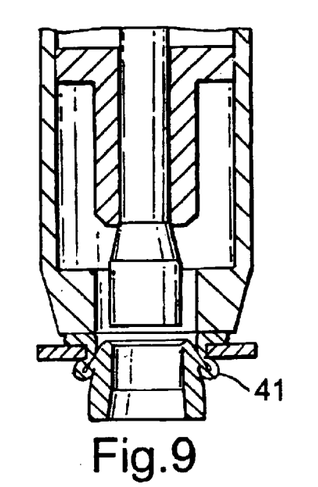

During the initial stage of its collapse, the interior of the body 14 of the insert is supported by the support tube 37, so that the collapse occurs symetrically, thus providing accurate positioning of the receptacle with respect to the hole and perpendicular to the plane of the workpiece. The support tube is withdrawn from the axially collapsing body, first by urging from the body 14 and later by the mandrel head taper 32.

As the mandrel head advances through the receptacle 16 of the insert, it does two things. Firstly, it radially expands the part of the body 14 which is adjacent the head 15 and inside the hole 38 in the workpiece 39 into tight contact with the wall of the hole, thus increasing the security of installation of the insert in the workpiece. This also allows for a substantial tolerance in the size of the hole 38 preformed in the workpiece.

Figure 10:
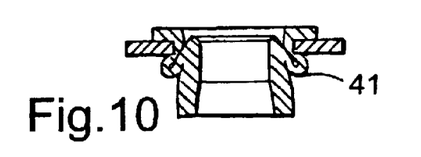

Secondly, it forms the enlarged inside wall of the bore of the receptacle to an accurately known diameter, thus dimensioning the bore of the installed receptacle with a close tolerance to the optimum diameter to receive the intended self-tap screw, and therefore good control of the tolerance needed to drive the screw. FIG. 10 shows the insert installed in the workpiece after the tool has been removed.

Figure 11:
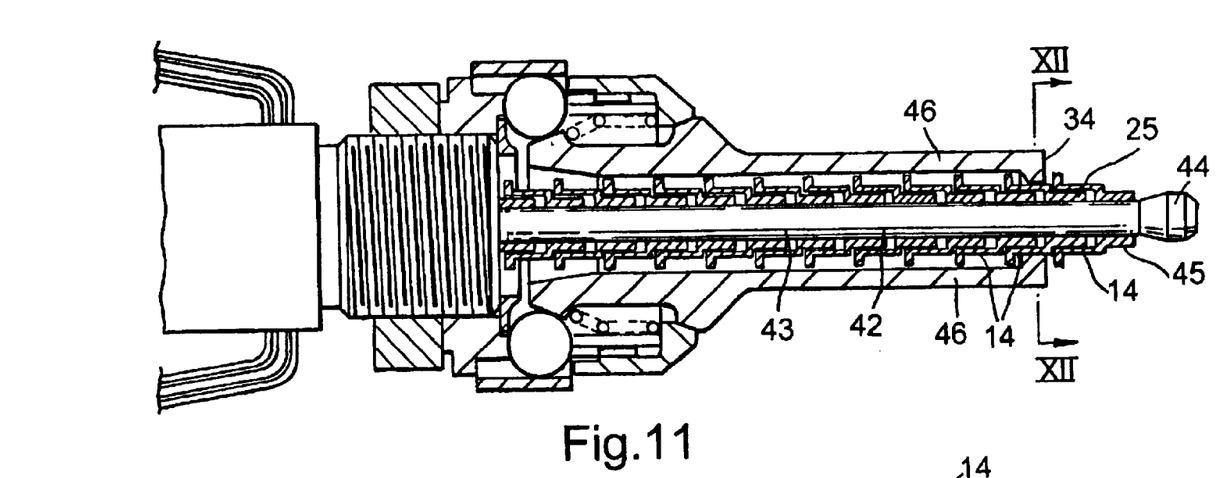
FIGS. 11 & 12 illustrate an installation tool for the repetition installation of inserts of a second form.
Figure 12:
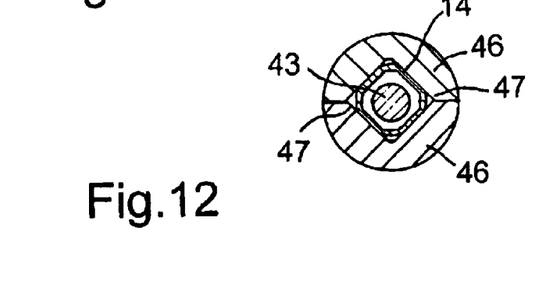

The mandrel 28 can be re-used for installing a large number of inserts, one at a time. However, a much more efficient method is to use a repetition system, in which a number of inserts can be loaded on the stem of a long mandrel to form a column of inserts which are advanced, as each insert is placed in turn. A suitable tool for doing this is illustrated in FIGS. 11 and 12, in which FIG. 11 is an axial longitudinal section through the nosepiece end of the tool and FIG. 12 is a cross-section on the line XII—XII of FIG. 11. Like parts to those in the tool of FIG. 6 are shown by like numbers.

The tool of this example is substantially identical with the well-known tools used for repetition installation of the tubular blind rivets which are well-known and widely available in many countries under the Registered Trade Marks CHOBERT and BRIV. The construction and operation of the tool need not be here further described.

As illustrated in FIG. 11, the fact that the exterior of the receptacle of each insert is a sliding fit within the body part of an identical insert provides two advantages. Firstly, this allows telescoping of the inserts on the mandrel, with the exterior of the receptacle 25 of each insert fitting within the body 14 of the insert next in front. This increases the number of inserts which can be pre-loaded on the long stem 42 of the repetition mandrel 43, the head 44 of which is drawn through the leading insert 45. The column of inserts is resiliently urged forwards along the reciprocable mandrel. When the mandrel is retracted, the head of the leading insert abuts against the nosepiece anvil 34, and the insert is deformed and installed in the same way as previously described. The second advantage is that during deformation and collapse, each insert body is supported and positioned by the receptacle of the next insert, instead of by the supporting tube 37 of the single-use tool described above. Support for the body portion of the last insert of the column is provided by a suitable tubular projection on the pusher or spring-follower (not shown) which urges the inserts forward.

As in the CHOBERT and BRIV systems, successive inserts are fed forwards one at a time through nosepiece jaws 46, which close behind the leading insert and grip the next following insert. The construction of the tool allows the use of a further feature of the invention. It will be recalled that the second form of the insert, shown in FIGS. 2A and 2B, has the exterior of its receptacle portion 25 of square shape. Thus when the square receptacle of one insert is received within the sliding-fit body of the next, rotational alignment of that next insert about the mandrel axis is defined and maintained. To this end, as illustrated in FIG. 12 the nosejaws 46 of the tool have interior faces which together form a square cross-section 47, corresponding to the square cross-section of the exterior of the insert body 14. Thus the insert held by the nosepiece jaws 46 is rotationally orientated by the jaws, and the leading insert which is about to be installed is rotationally orientated by the receptacle of the aforementioned insert behind it within its body. Thus, whether the installation tool is hand-held or machine supported and guided, accurate orientation of the insert to be installed, with the preformed square hole in the workpiece can be achieved.

FIGS. 13 to 18 are generally similar to FIGS. 6 to 10, but show in smaller increments the progress of deformation of the insert, the supporting receptacle of the next insert being omitted for clarity of illustration, and the nosejaws being shown in simplified form.

Figure 13:
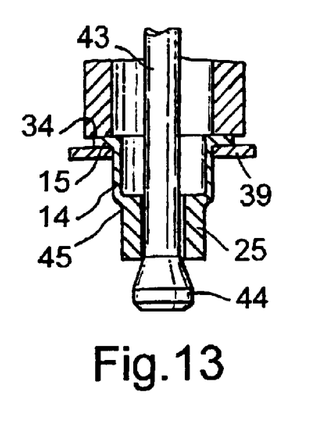
FIGS. 13 to 18 illustrate the progressive stages in the deformation of the second form of insert as it is installed by the tool of FIGS. 11 & 12.
Figure 14:
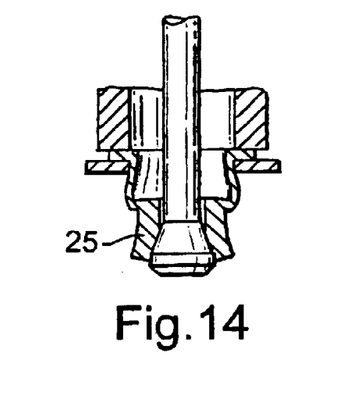

FIG. 13 shows the relationship between the insert 45, the mandrel 43 and the nosetip anvil 34 of the placing tool at the commencement of the installation operation when the pulling force applied to the mandrel is low. As the pulling force on the mandrel increases in magnitude, the mandrel head 44 begins to deform and radially expand the receptacle 25 of the insert. At the same time the body 14 "bulbs" whilst axially contracting. Because the exterior diameter of the receptacle 25 at its junction with the body 14 is of a smaller diameter than the exterior diameter of the body, the line of force as it reacts through the body wall is offset. This provides a moment of force which acts to urge the body wall to expand radially outwards as shown in FIG. 14.

Figure 15:
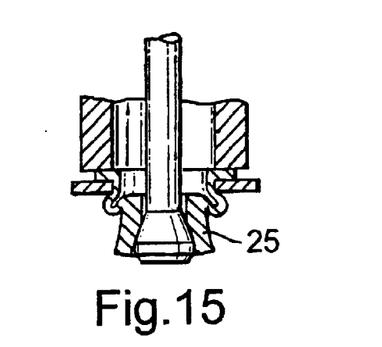

As more of the mandrel head progressively enters the receptacle 25, there comes a point there the force required to cause further expansion of the receptacle by the mandrel head 44 is sufficiently great to cause the body portion to collapse axially and expand radially, as can be seen in FIG. 15.

Figure 16:
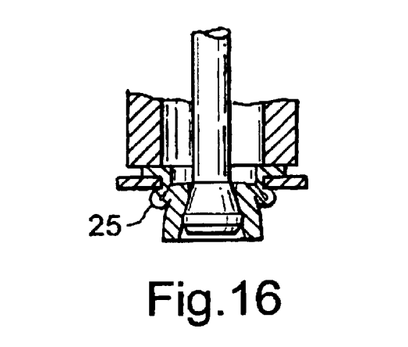

This continues until the deformed base of the body contacts the deformed base of the inner wall of the body as shown in FIG. 16.

Figure 17:
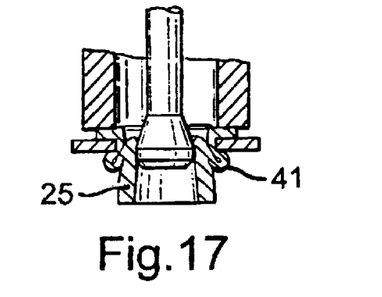

As the pulling force of the mandrel increases, the mandrel head 44 is drawn through the bore of the receptacle 25, expanding it and further deforming the base of the body 14 into a conical shape. The outer surface of the cone is pressed hard against the deformed inner wall of the body, as shown in FIG. 17, which in turn forces the outer deformed surface of the body hard against the workpiece. This has two purposes; it provides an installed insert which is very securely fixed to the workpiece with no risk of looseness or rattling, and secondly, where there is a large variation in the hole size, it always ensures that the expansion of the body of the insert is sufficient to fill the hole in the workpiece.

Figure 18:
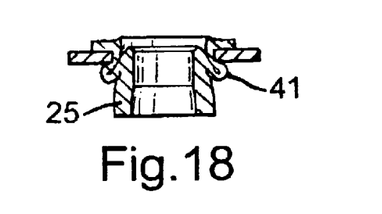

The final installed configuration of the insert is shown in FIG. 18. This shows that the conical deformed shape of the base of the body is positioned relative to the body wall in such a way that it supports the body wall and therefore adds strength to the installed insert. It also means that the receptacle portion is held rigid in an axial and radial direction relative to the head of the insert.

Figure 19:
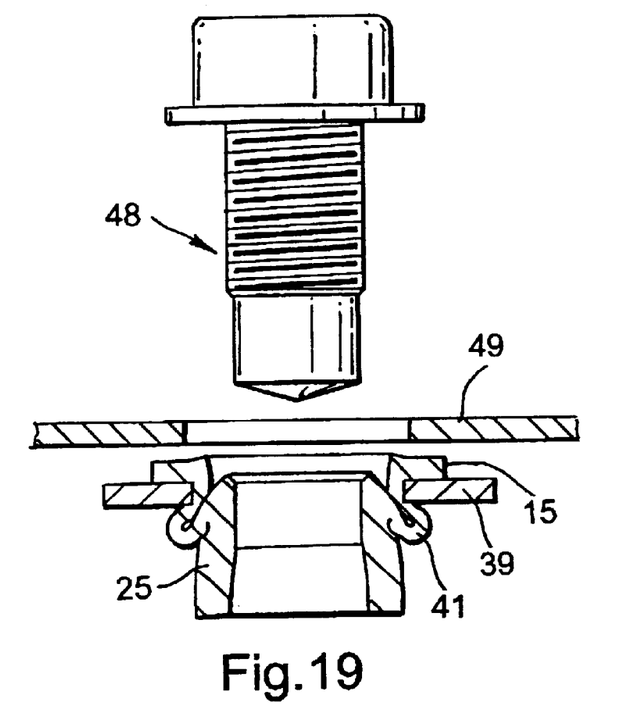
FIGS. 19 & 20 illustrate a self-tap screw being screwed into an installed insert.
Figure 20:
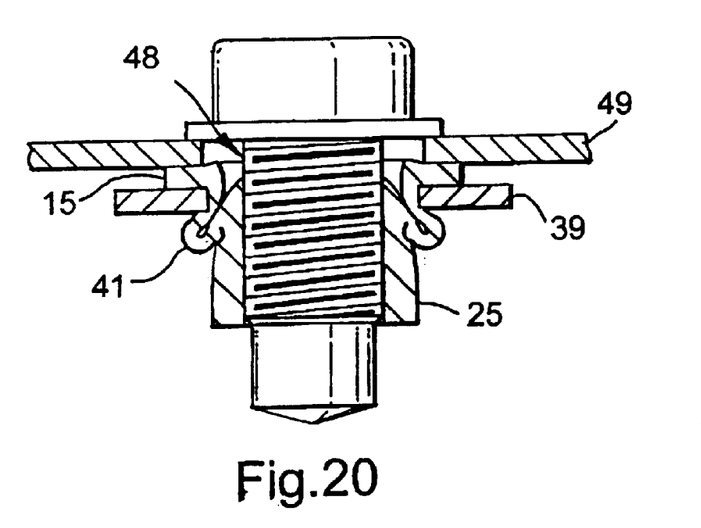

FIGS. 19 & 20 illustrate the insertion of a self-tap screw 48 into the installed receptacle 25 to attach a component 49 to the workpiece. The action of tightening the self-tapping screw 48 will further force the conical face against the interior face of the deformed body to maintain the rigidity of the insert.

In the foregoing example, the insert is made of low carbon steel. Typically the thickness of the wall of the body portion 14 would be 0.4 mm.

The invention is not restricted to the details in the foregoing examples. For instance, the non-circular shapes need not be square but could be, for example, hexagonal.

What is claimed is:

1. An insert for installation in a relatively thin or weak workpiece to provide an anchor for a self-tapping screw, which insert is in the form of an integral metal structure which comprises:
    a body portion;
    a head portion located at or near one end of the body portion and extending radially therefrom;
    a receptacle portion located at the other end of the body portion remote from the head portion; and
    a through bore extending throughout the head, body and receptacle portions;
    the interior bore of the receptacle portion being substantially unthreaded for the reception of a self-tapping screw;
    in which the exterior cross-sectional shape and dimensions of the receptacle portion, and the interior cross-sectional shape and dimensions of the body portion are respectively such that the body portion is deformable, when the receptacle portion is drawn towards the head portion, to secure the insert in a suitable hole in a workpiece through which the receptacle and body portions have been inserted so that the head portion is adjacent the workpiece and a substantial length of the body portion protrudes beyond the workpiece; and in which any transverse dimension of the exterior of the receptacle portion is no greater than the corresponding transverse dimension of the interior of the body portion in the same transverse plane; the exterior cross-sectional shape and dimensions of the receptacle portion, and the interior cross-sectional shape and dimensions of the body portion being such that, when the receptacle portion is drawn towards the head portion, the part of the body portion nearer the receptacle portion enters inside the part of the body portion nearer the head thereby to enhance the engagement of the deformed body portion with the workpiece.

2. An insert for installation in a relatively thin or weak workpiece to provide an anchor for a self-tapping screw, which insert is in the form of an integral metal structure which comprises:
    a body portion;
    a head portion located at or near one end of the body portion and extending radially therefrom;
    a receptacle portion located at the other end of the body portion remote from the head portion; and
    a through bore extending throughout the head, body and receptacle portions;
    the interior bore of the receptacle portion being substantially unthreaded for the reception of a self-tapping screw;
    the body portion being deformable, when the receptacle portion is drawn towards the head portion, to secure the insert in a suitable hole in a workpiece through which the receptacle and body portions have been inserted so that the head portion is adjacent the workpiece and a substantial length of the body portion protrudes beyond the workpiece;
    the exterior cross-sectional shape and dimensions of the receptacle portion being smaller than the interior cross-sectional shape and dimensions of the body portion, such that the receptacle portion of the insert is a sliding fit within the body portion of an identical insert.

3. An insert as claimed in claim 2 wherein the exterior cross-sectional shape and dimensions of the receptacle portion, and the interior cross-sectional shape and dimensions of the body portion are respectively such that the body portion is deformable, when the receptacle portion is drawn towards the head portion, to secure the insert in a suitable hole in a workpiece through which the receptacle and body portions have been inserted so that the head portion is adjacent the workpiece and a substantial length of the body portion protrudes beyond the workpiece; and in which any transverse dimension of the exterior of the receptacle portion is no greater than the corresponding transverse dimension of the interior of the body portion in the same transverse plane; the exterior cross-sectional shape and dimensions of the receptacle portion, and the interior cross-sectional shape and dimensions of the body portion being such that, when the receptacle portion is drawn towards the head portion, the part of the body portion nearer the receptacle portion enters inside the part of the body portion nearer the head thereby to enhance the engagement of the deformed body portion with the workpiece.

4. An insert as claimed in claim 2, in which both the exterior cross-sectional shape of the receptacle portion and the interior cross-sectional shape of the body portion are substantially non-circular.

5. An insert as claimed in claim 2, in which the interior cross sectional shape of the body portion is substantially non-circular and the exterior cross-sectional shape of the receptacle portion is substantially circular.

6. An insert as claimed in claim 4, in which the exterior cross sectional shape of the body portion of the insert is also substantially non-circular.

7. A plurality of inserts in combination with a pull-through mandrel for installing the inserts in succession, each insert being for installation in a relatively thin or weak workpiece to provide an anchor for a self-tapping screw, which insert is in the form of an integral metal structure which comprises;
- a body portion;
- a head portion located at or near one end of the body portion and extending radially therefrom;
- a receptacle portion located at the other end of the body portion remote from the head portion; and
- a through bore extending throughout the head, body and receptacle portions;
- the interior bore of the receptacle portion being substantially unthreaded for the reception of a self-tapping screw;
- the body portion being deformable, when the receptacle portion is drawn towards the head portion, to secure the insert in a suitable hole in a workpiece through which the receptacle and body portions have been inserted so that the head portion is adjacent the workpiece and a substantial length of the body portion protrudes beyond the workpiece;
- the exterior cross-sectional shape and dimensions of the receptacle portion being smaller than the interior cross-sectional shape and dimensions of the body portion, such that the receptacle portion of the insert is a sliding fit within the body portion of an identical insert;
- the mandrel comprising an elongated stem and an enlarged head, the plurality of inserts being loaded on the stem with the receptacle portion of each insert facing towards the mandrel head and received within the body portion of the adjacent insert.

8. The combination as claimed in claim 7, in which both the exterior cross-sectional shape of the receptacle portion, and the interior cross-sectional shape of the body portion, of each insert are substantially non-circular.

9. The combination of a plurality of inserts with a mandrel as claimed in claim 8 in which each substantially non-circular shape is substantially square.

10. An insert installation tool for installing a plurality of inserts, each insert being for installation in a relatively thin or weak workpiece to provide an anchor for a self-tapping screw, which insert is in the form of an integral metal structure which comprises:
- a body portion;
- a head portion located at or near one end of the body portion and extending radially therefrom;
- a receptacle portion located at the other end of the body portion remote from the head portion; and
- a through bore extending throughout the head, body and receptacle portions;
- the interior bore of the receptacle portion being substantially unthreaded for the reception of a self-tapping screw;
- the body portion being deformable, when the receptacle portion is drawn towards the head portion, to secure the insert in a suitable hole in a workpiece through which the receptacle and body portions have been inserted so that the head portion is adjacent the workpiece and a substantial length of the body portion protrudes beyond the workpiece;
- the exterior cross-sectional shape and dimensions of the receptacle portion being smaller than the interior cross-sectional shape and dimensions of the body portion, such that the receptacle portion of the insert is a sliding fit within the body portion of an identical insert, and wherein both the exterior cross-sectional shape of the receptacle portion and the interior cross-sectional shape of the body portion are substantially non-circular; which installation tool comprises the combination of a plurality of such inserts together with a pull-through mandrel, for installing the inserts in succession, the mandrel comprising an elongated stem and an enlarged head, the plurality of inserts being loaded on the stem with the receptacle portion of each insert facing towards the mandrel head and received within the body portion of the adjacent insert, and in which the exterior cross-sectional shape of the body portion of each insert is also substantially non-circular, the installation tool further comprising means for engaging with the non-circular exterior of the body portion of an insert behind the leading insert which is about to be installed, thereby to orientate the engaged insert axially about the mandrel and thereby orientate the leading insert which is about to be installed.

11. An insert installation tool as claimed in claim 10 in which each substantially non-circular shape is substantially square.

12. A method of installing an insert in a workpiece, the insert being for installation in a relatively thin or weak workpiece to provide an anchor for a self-tapping screw, which insert is in the form of an integral metal structure which comprises:
- a body portion;
- a head portion located at or near one end of the body portion and extending radially therefrom;
- a receptacle portion located at the other end of the body portion remote from the head portion; and
- a through bore extending throughout the head, body and receptacle portions;
- the interior bore of the receptacle portion being substantially unthreaded for the reception of a self-tapping screw;
- the body portion being deformable, when the receptacle portion is drawn towards the head portion, to secure the insert in a suitable hole in a workpiece through which the receptacle and body portions have been inserted so that the head portion is adjacent the workpiece and a substantial length of the body portion protrudes beyond the workpiece;
- the exterior cross-sectional shape and dimensions of the receptacle portion being smaller than the interior cross-sectional shape and dimensions of the body portion, such that the receptacle portion of the insert is a sliding fit within the body portion of an identical insert;

which method comprises:
- inserting the receptacle and body portions of the insert through a suitable hole in the workpiece so that a substantial length of the body portion protrudes beyond the workpiece;
- providing a mandrel having an elongated stem which extends through the bore of the insert, the mandrel comprising a stem which is a sliding fit in the interior of the receptacle portion and a radially enlarged head beyond the receptacle portion;
- providing a tubular interior supporting member circumferentially outside the mandrel stem and inside the body portion of the insert within which is it a sliding fit;
- supporting the head portion of the insert against the workpiece;

withdrawing the mandrel with respect to the head portion of the insert so that it engages the receptacle portion of the insert and applies an axial force to it which causes the body portion to collapse axially while it is supported internally by the tubular supporting member.

13. A method as claimed in claim 12, in which the tubular supporting member forms part of an installation tool and is re-usable on successively installed inserts.

14. A method as claimed in claim 12, in which the tubular supporting member is provided by the receptacle portion of a further insert through which the mandrel also extends.

15. A method as claimed in claim 12, in which the receptacle portion of the insert is drawn into the body portion of the insert, the interior supporting member being progressively withdrawn as the receptacle portion advances thereby to assist in its deformation and engagement with the workpiece.

16. A method as claimed in claim 15, in which the mandrel head is drawn completely through the receptacle portion of the insert, thereby to form the bore through the receptacle portion to a predetermined diameter.

17. A method of installing an insert as claimed in claim 12 in which both the exterior cross-sectional shape of the receptacle portion and the interior cross-sectional shape of the body portion are substantially square are substantially square.

18. An insert as claimed in claim 1, in which both the exterior cross-sectional shape of the receptacle portion and the interior cross-sectional shape of the body portion are substantially non-circular.

19. An insert as claimed in claim 18 in which each substantially non-circular shape is substantially square.

* * * * *